(12) United States Patent
Woods et al.

(10) Patent No.: US 10,482,095 B2
(45) Date of Patent: Nov. 19, 2019

(54) SYSTEM AND METHOD FOR PROVIDING A SEARCHABLE PLATFORM FOR ONLINE CONTENT INCLUDING METADATA

(71) Applicant: DISNEY ENTERPRISES, INC., Burbank, CA (US)

(72) Inventors: Michael Woods, Burbank, CA (US); Ryan Lissack, Burbank, CA (US); Christine Ordaz, Burbank, CA (US); Yael Miller, Burbank, CA (US); Philip Leszczynski, Burbank, CA (US); Narbeh Dereghishian, Burbank, CA (US); Michael Garcia, Burbank, CA (US); Benjamin Collier, Burbank, CA (US); Kristopher Johns, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 245 days.

(21) Appl. No.: 15/134,325

(22) Filed: Apr. 20, 2016

(65) Prior Publication Data
US 2017/0308588 A1 Oct. 26, 2017

(51) Int. Cl.
*G06F 16/00* (2019.01)
*G06F 16/248* (2019.01)
(Continued)

(52) U.S. Cl.
CPC ........ *G06F 16/248* (2019.01); *G06F 16/2455* (2019.01); *G06F 16/31* (2019.01);
(Continued)

(58) Field of Classification Search
CPC ......... G06F 17/30784; G06F 17/30817; G06F 17/3082; G06F 17/30823; G06F 17/30752;
(Continued)

(56) References Cited

U.S. PATENT DOCUMENTS

2005/0154680 A1* 7/2005 Schmelzer ........ G06F 17/30026
705/67
2006/0242178 A1* 10/2006 Butterfield ........ G06F 17/30038
707/999.1

(Continued)

*Primary Examiner* — Vincent F Boccio
(74) *Attorney, Agent, or Firm* — Esplin & Associates, PC

(57) ABSTRACT

Systems and methods for providing a searchable platform for online content. Online content may be obtained over a network. The online content may have existing metadata associated with the online content. The existing metadata may include platform information related to distribution of the online content through the online content distribution platform, file information related to an electronic file that defines the online content, and/or other information. The existing metadata associated with the online content may be processed such that the existing metadata is searchable. Supplemental metadata for the online content may be obtained. The supplemental metadata may be associated with the online content. The supplemental metadata may include one or more of platform information, file information, content information, contextual information, and/or other information. A search query may be received and a result may be generated based the existing metadata and/or the supplemental metadata. The result may be presented.

20 Claims, 3 Drawing Sheets

(51) Int. Cl.
  *G06F 16/2455* (2019.01)
  *H04L 29/08* (2006.01)
  *G06F 16/31* (2019.01)
  *G06F 16/33* (2019.01)

(52) U.S. Cl.
  CPC .......... *G06F 16/3331* (2019.01); *H04L 67/02* (2013.01); *H04L 67/1097* (2013.01)

(58) Field of Classification Search
  CPC .... G06F 16/2455; G06F 16/248; G06F 16/31; G06F 16/3331; H04L 67/1097; H04L 67/02
  USPC .......................................................... 707/707
  See application file for complete search history.

(56) References Cited

U.S. PATENT DOCUMENTS

| | | | |
|---|---|---|---|
| 2008/0109369 A1* | 5/2008 | Su .......................... | G06Q 10/06 705/59 |
| 2009/0007167 A1* | 1/2009 | Artom .................... | G06Q 99/00 707/999.01 |
| 2009/0177971 A1* | 7/2009 | Kim ........................ | H04L 67/02 715/739 |
| 2009/0204571 A1* | 8/2009 | Shizuno ............ | H04L 29/12132 |
| 2013/0086159 A1* | 4/2013 | Gharachorloo ... | G06F 17/30038 709/204 |
| 2015/0205824 A1* | 7/2015 | Morten ............. | G06F 17/30817 707/600 |

* cited by examiner

SYSTEM AND METHOD FOR PROVIDING A SEARCHABLE PLATFORM FOR ONLINE CONTENT INCLUDING METADATA

FIELD OF THE INVENTION

The disclosure relates to systems and methods configured for providing a searchable platform for online content including metadata.

BACKGROUND OF THE INVENTION

Online content may be created by a variety of users and hosted on a variety of platforms. An entity may monetize the online content created by their network of users. Monetizing the online content may include publishing the online content in a variety of locations and generating revenue via monetization methods including advertising. The online content may consist of large quantities of short form content (e.g., content that may be short in length) that must be monitored and managed by the entity. As the online content may include lower value assets in mass quantity, the manual management of the online content may be tedious, expensive, and inefficient.

SUMMARY

The disclosure herein relates to providing a searchable platform for online content including metadata. The searchable platform may include large quantities of online content including associated metadata that is searchable. The metadata may include existing metadata that is obtained upon ingestion and processed such that it is searchable. Supplemental metadata may be obtained and associated with the online content such that it may be searched. The platform may be configured to distribute the online content to various distribution platforms having a variety of requirements for the online content.

The system may be configured to ingest large quantities of online content including the metadata associated with the online content. The metadata may be processed such that it is searchable via a platform for the online content. Supplemental metadata may added to the system and associated with the online content by processing the online content and/or receiving information from one or more users and/or entities reviewing the online content. A search query may cause the system to generate a result including online content that satisfies the search query based on the existing metadata and/or the supplemental metadata associated with the online content. The result may be presented on one or more client computing platforms associated with the users. The system may effectively ingest large quantities of online content such that the online content is searchable and may be distributed to various platforms having a variety of guidelines.

A system configured for providing a searchable platform for online content including metadata may include one or more server(s) and/or one or more client computing platforms. The server(s) and the client computing platform(s) may communicate in a client/server configuration and/or other configuration. The server(s) may include one or more processors configured by machine-readable instructions to execute computer program components. The computer program components may include a content component, a metadata processing component, a supplemental metadata component, a search component, a distribution platform component, a transmission component, a user interface component, and/or other components.

The content component may be configured to obtain online content over a network. The online content may include online media content such as video content, audio content, image content, and/or other online content. The online content may and/or may not be obtained over a network. In some implementations, the online content may be uploaded from a storage device and/or otherwise obtained. The online content may be available to content consumers through an online content distribution platform. In some implementations, the online content may be obtained via hard drives and/or by a user directly. The online content may have existing metadata associated with the online content. The existing metadata may include one or more of platform information, file information, and/or other information. Platform information may be related to distribution of the online content through an online content distribution platform. File information may be related to an electronic file that defines the online content.

The metadata processing component may be configured to process the existing metadata associated with the online content. The existing metadata may be processed in a manner such that the existing metadata is made searchable. The supplemental metadata component may be configured to obtain supplemental metadata for the online content. The supplemental metadata may be associated with the online content and include one or more of source information, file information, content information, contextual information, and/or other information.

The content information may describe and/or be related to content included in the online content. The content information may include temporal information associated with the content included in the online content. The temporal information may indicate points in time within the online content associated with individual ones of the content included in the online content. Contextual information may be indirectly associated and/or related to the online content.

In some implementations, the supplemental metadata component may be configured to generate the supplemental metadata based on the online content. In some implementations, the supplemental metadata component may be configured to obtain the supplemental metadata by receiving one or more of source information, file information, content information, contextual information, and/or other information from one or more client computing platforms associated with the users.

The search component may be configured to receive a search query from one or more client computing platforms associated with users. The search component may be configured to generate a result for the search query based the existing metadata and/or the supplemental metadata. The result may include the online content associated with the existing metadata and/or the supplemental metadata satisfying the search query.

The search component may be configured to effectuate presentation of the result on the one or more client computing platforms associated with the users. The users may include a content manager, editing entity, producer, talent, and/or other user associated with the online content. Effectuating presentation of the result may include causing the one or more client computing platforms (e.g., via the user interface component) to display the result.

The distribution platform component may be configured to identify a distribution platform that an individual online content should be transmitted to. The distribution platform that the individual online content should be transmitted to may be identified based on one more of the existing metadata, the supplemental metadata, other metadata, and/or other information. The distribution platform component may be configured to obtain distribution platform specific processing guidelines corresponding to the identified distribution platform. The distribution platform specific processing guidelines may indicate one or more guidelines the online content should meet and/or steps the online content should go through in order to be distributed via the corresponding distribution platform.

The distribution platform component may be configured to determine whether the individual online content is ready to be distributed to the identified distribution platform. The distribution platform component may be configured to transmit online content information conveying the individual online content and one or more of the existing metadata associated with the individual online content, the supplemental metadata associated with the individual online content, and/or other information to the identified distribution platform. The transmission of the online content information may be responsive to a determination that the individual online content is ready to be distributed to the identified distribution platform. In some implementations, the online content may be distributed by a direct transfer, set up through a feed, and/or via other distribution processes.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the any limits. As used in the specification and in the claims, the singular form of "a", "an", and "the" include plural referents unless the context clearly dictates otherwise.

DETAILED DESCRIPTION

Figure 1:
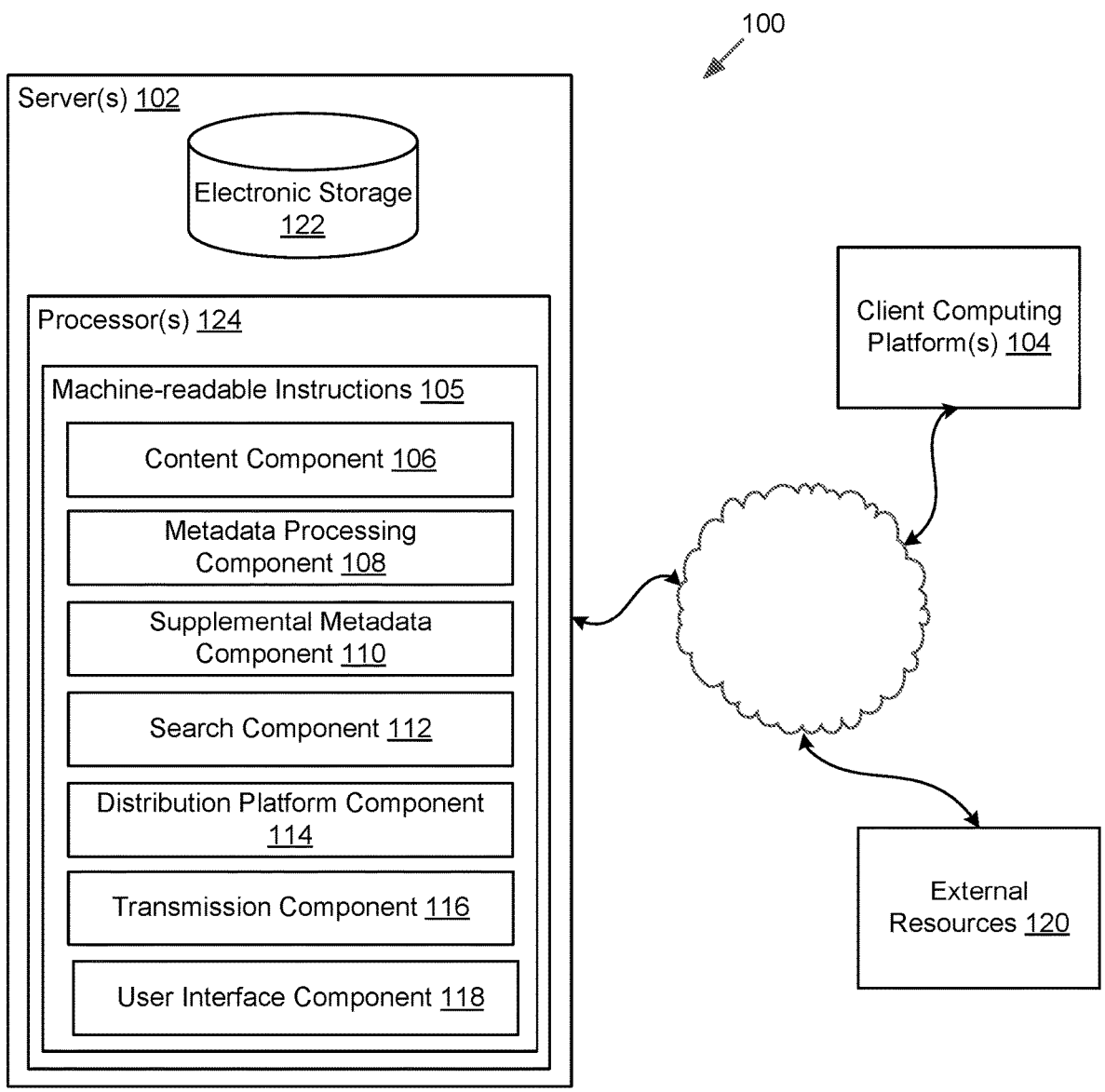
FIG. 1 illustrates a system configured for providing a searchable platform for online content including metadata, in accordance with one or more implementations.

FIG. 1 illustrates an example system 100 that is configured for providing a searchable platform for online content including metadata. The system may be configured to ingest large quantities of online content including the metadata associated with the online content. The metadata may be processed such that it is searchable via a platform for the online content. Supplemental metadata may be added to the system and associated with the online content by processing the online content and/or receiving information from one or more users and/or entities reviewing the online content. A search query may cause the system to generate a result including online content that satisfies the search query based on the existing metadata and/or the supplemental metadata associated with the online content. The result may be presented on one or more client computing platforms associated with the users. As illustrated in FIG. 1, system 100 may include one or more server(s) 102, one or more client computing platform(s) 104, electronic storage 122, one or more physical processor(s) 124 configured to execute machine-readable instructions 105, one or more computer program components, and/or other components.

One or more physical processor(s) 124 may be configured to execute machine-readable instructions. Executing machine-readable instructions 105 may cause the one or more physical processor(s) 124 to provide a searchable platform for online content including metadata. Machine-readable instructions 105 may include one or more computer program components such as a content component 106, a metadata processing component 108, a supplemental metadata component 110, a search component 112, a distribution platform component 114, a transmission component 116, a user interface component 118, and/or other components.

In some implementations, server(s) 102 may be configured to provide remote hosting of the features and/or function of machine-readable instructions 105 to one or more client computing platform(s) 104 that may be remotely located from server(s) 102. However, in some implementations, one or more features and/or functions of server(s) 102 may be attributed as local features and/or functions of one or more client computing platform(s) 104. For example, individual ones of the client computing platform(s) 104 may include machine-readable instructions (not shown in FIG. 1) comprising the same or similar components as machine-readable instructions 105 of server(s) 102. The client computing platform(s) 104 may be configured to locally execute the one or more components that may be the same or similar to the machine-readable instructions 105. One or more features and/or functions of machine-readable instructions 105 of server(s) 102 may be provided, at least in part, as an application program that may be executed at a given client computing platform 104.

The client computing platform(s) 104 may include one or more of a cellular telephone, a smartphone, a digital camera, a laptop, a tablet computer, a desktop computer, a television set-top box, smart TV, a gaming console, and/or other platforms.

Server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting and that the scope of this disclosure includes implementations in which server(s) 102, client computing platform(s) 104, and/or external resources 120 may be operatively linked via some other communication media.

Figure 2:
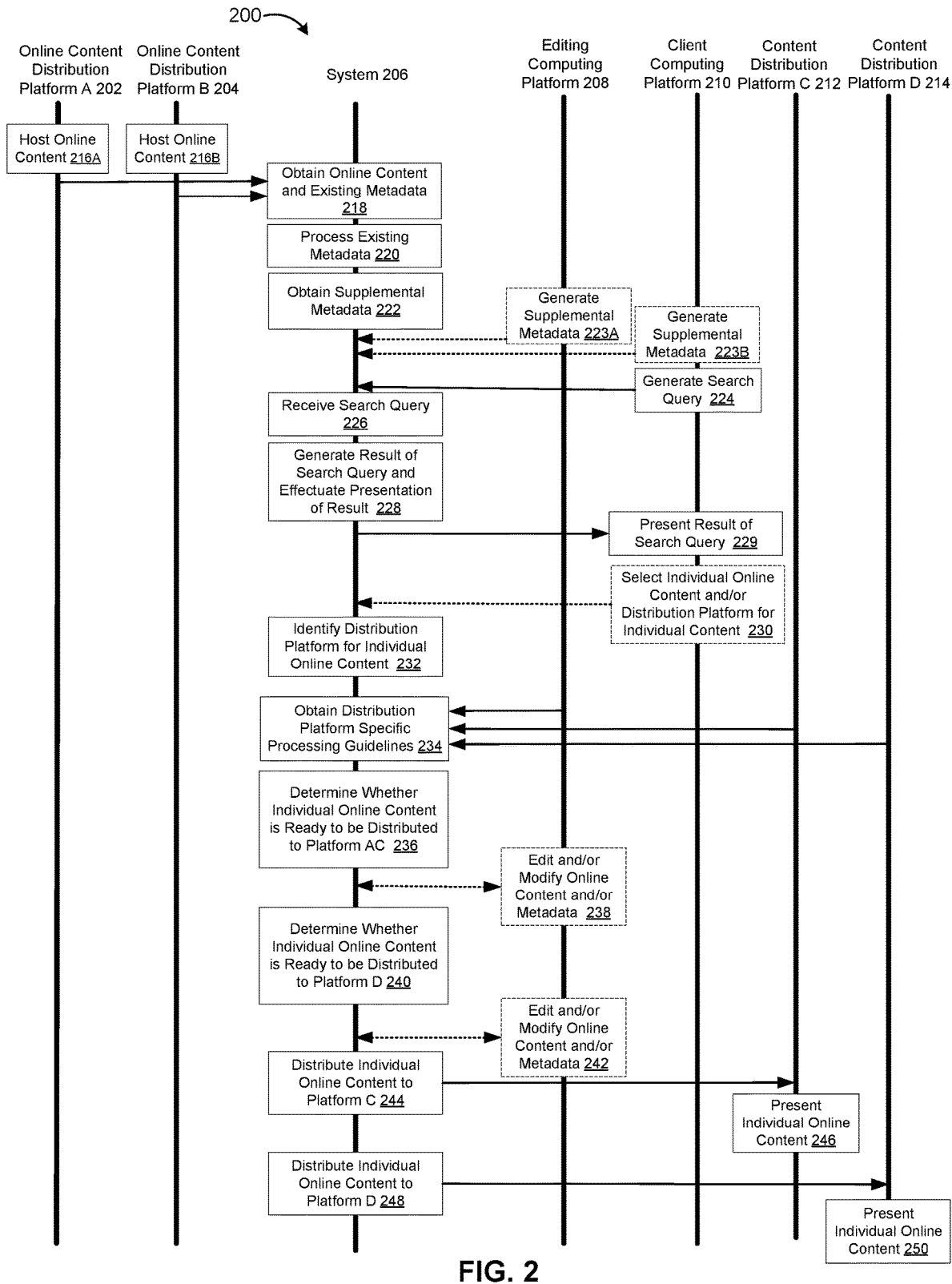
FIG. 2 illustrates a workflow process depicting the functionality of a system configured for providing a searchable platform for online content including metadata, in accordance with one or more implementations.

FIG. 2 illustrates a workflow process 200 depicting the functionality of a system 206 configured for providing a searchable platform for online content including metadata, in accordance with one or more implementations. The steps, entities, and/or platforms of workflow process 200 presented below are intended to be illustrative and non-limiting examples. In certain implementations, workflow process 200 may be accomplished with one or more additional steps, entities, and/or platforms not described, and/or without one or more of the steps, entities, and/or platforms discussed. Additionally, the order and direct in which the steps of workflow process 200 are illustrated in FIG. 2 and described below is not intended to be limiting.

System 206 may be the same as or similar to system 100 as illustrated in FIG. 1. Workflow process 200 may include multiple entities and/or platforms configured to communicate with system 206 including one or more of an online content distribution platform A 202, an online content distribution platform B 204, an editing platform 208, a client computing platform 210, a distribution platform C 212, a distribution platform D 214, other entities, and/or other platforms.

Online content distribution platform A 202 and online content distribution platform B 204 may be configured to host online content at steps 216. The online content may include online media content available to content consumers via online content distribution platform A 202, online content distribution platform B 204, and/or other online content distribution platforms. System 206 may be configured to obtain the online content and existing metadata associated with the online content from one or more of online content distribution platform A 202, online content distribution platform B 204, and/or other online content distribution platforms at step 218. At step 220, system 206 may process the existing metadata such that it may be searchable. At step 222, system 206 may obtain supplemental metadata from one or more of editing computing platform 208, client computing platform 210, and/or other locations. Editing computing platform 208 may be associated with one or more users and/or entities tasked with clearing, editing, reviewing, and/or modifying the online content for distribution. In some implementations, editing computing platform 208 and client computing platform 210 may be the same computing platform and/or associated with the same entity and/or user. Client computing platform 210 may be associated with one or more users, content managers, talent, and/or entities tasked with searching, identifying, and/or selecting the online content for distribution. In some implementations, system 206 may obtain the supplemental metadata by processing the online content and/or generating the supplemental metadata.

At step 224, the user and/or entity associated with client computing platform 210 may identify parameters of the search query such that client computing platform 210 may generate a search query. The search query may be transmitted to system 206 such that it is received at step 226. At step 228, system 206 may be configured to generate a result of the search query and effectuate presentation of a result on client computing platform 210 (e.g., by transmitting result information to client computing platform 210). Generating the result of the search query may include identifying the online content including metadata (e.g., existing and/or supplemental) that satisfies the parameters of the search query. At step 229, client computing platform 210 may present the search result such that a user and/or entity may view the search result and/or select one or more individual ones of the online content. At step 230, the user may determine and/or select (e.g., via client computing platform 210) one or more individual ones of the online content for distribution, and/or one or more distribution platforms (e.g., distribution platform C 212, distribution platform D 214, and/or other distribution platforms) to distribute the online content to.

At step 232, a distribution platform for an individual online content may be identified. The individual content may include a content selected by the user and/or system 206. The distribution platform identified for the individual online content may be identified by system 100 (e.g., based on the metadata and/or other information) and/or selected by a user and/or entity. Distribution platform specific processing guidelines may be obtained at step 234 based on the distribution platform identified in step 232. The distribution platform specific processing guidelines may include one or more guidelines the online content should meet and/or steps the online content should go through in order to be distributed via the corresponding distribution platform. The distribution platform specific processing guidelines may be obtained from one or more of distribution platform C 212, distribution platform D 214, other distribution platforms, client computing platform 210, editing computing platform 208, and/or other sources.

At step 236, system 206 may be configured to determine whether the individual online content is ready to be distributed to platform C 212. Responsive to a determination that the individual online content is ready to be distributed to content distribution platform C 212, the individual online content may be distributed to content distribution platform C 212. In some implementations, responsive to a determination that the individual online content is not ready to be distributed to content distribution platform 212, system 206 may be configured to transmit the online content to editing computing platform 208 such that the online content may be edited and/or modified based on the distribution platform specific processing guidelines at step 238. Content distribution platform C 212 may be configured to present the individual online content.

At step 240, system 206 may be configured to determine whether the individual online content is ready to be distributed to content platform D 214. Responsive to a determination that the individual online content is ready to be distributed to content distribution platform D 214, the individual online content may be distributed to content distribution platform D 214. In some implementations, responsive to a determination that the individual online content is not ready to be distributed to distribution platform D 214, system 206 may be configured to transmit the online content to editing computing platform 208 such that the online content may be edited and/or modified based on the distribution platform specific processing guidelines at step 242. Distribution platform D 214 may be configured to present the individual online content.

Returning to FIG. 1, content component 106 may be configured to obtain online content over a network. Online content may be online media content. For example, online content may include video content, audio content, image content, and/or other online content. The online content may be obtained from one or more online content distribution platforms. In some implementations, the online content may be available to content consumers through an online content distribution platform. In some implementations, the online content may and/or may not be obtained over a network. The online content may be obtained via hard drive(s), databases, and/or by a user directly. An online content distribution platform, for example, may include one or more of YOUTUBE®, MAKER.TV®, SNAPCHAT® FACEBOOK®, VINE®, VIMEO®, INSTAGRAM®, TWITTER®, MYSPACE®, GOOGLE+®, an online content manager associated with system 100 (e.g., via which talent and/or content producers submit online content), and/or other online content distribution platforms. Online content distribution platforms may be the same as and/or different than content distribution platforms as described herein.

Obtaining the online content may include ingesting the online content from one or more online content distribution platforms into system 100. For example, content component 106 may be configured to ingest high quantities (e.g., tens of thousands, millions, tens of millions, hundreds of millions, billions, etc.) of short-form online content (e.g., video content, and/or other online content). In some implementations, the online content ingested may have one or more commonalities. For example, the ingested online content may be created by users and/or talent within a given network of users and/or talent.

The online content may have existing metadata associated with the online content. The existing metadata may include one or more of platform information, file information, content information, contextual information, and/or other information. Platform information may be related to distribution of the online content through an online content distribution platform. Platform information may include one or more of a channel with which the online content is associated, title information for the online content, artwork associated with the online content (e.g., a thumbnail image, images related to the channel and/or franchise associated with the online content, and/or other artwork associated with the online content), caption information of the online content, online content description information, search engine optimization keywords associated with the online content, a publish date of the online content, a view count of the online content, a playlist associated with the online content, viewer retention information related to the online content (e.g., information indicating frequently watched portions the online content and/or points where users typically stop watching the online content), trending topics associated with the platform via which the online content is distributed, rating information (e.g., user ratings and/or content rating indicating suitability of the online content to its audience) for the online content, and/or other platform information related to distribution of the online content through an online content distribution platform.

Platform information may be obtained by content component 106 from one or more distributions platforms from which the online content is obtained. As such, the existing metadata including platform information may describe the online content as available via the online content distribution platform, the online content distribution platform itself, and/or other information related to the online content generated by and/or for the online content distribution platform.

File information may be related to an electronic file that defines the online content. File information may indicate a file type, file size, resolution, encoding format, bit rate, and/or other file information related to the electronic file that defines the online content. File information may be obtained by content component 106 with the online content as existing metadata associated with the online content.

Metadata processing component 108 may be configured to process the existing metadata associated with the online content. The existing metadata may be processed in a manner such that the existing metadata is made searchable. The existing metadata and/or the online content may be obtained from a variety of sources. As such, the existing metadata may have varying formats and/or content. Metadata processing component 108 may be configured to process the existing metadata associated with the online content obtained in a manner that normalizes the existing metadata. Processing the existing metadata to normalize the existing metadata may include converting a format of one or more existing metadata associated with one or more individual online content such that all of the existing metadata has a consistent format. This may enable the existing metadata to be searched.

Supplemental metadata component 110 may be configured to obtain supplemental metadata for the online content. The supplemental metadata may be obtained from one or more sources the same as or different than the sources from which the associated online content is obtained. The supplemental metadata may be associated with the online content. Supplemental metadata component 110 may be configured to associate the supplemental metadata obtained with the online content. The supplemental metadata component 110 may be configured to associate the supplemental metadata obtained with the given online content based on the metadata being related to and/or directed to the given online content. Associating the supplemental metadata with the online content may include associating individual ones of the supplemental metadata with individual ones of the online content to which the individual ones of the supplemental metadata may pertain to. Supplemental metadata may include one or more of source information, file information, content information, contextual information, and/or other information. The supplemental metadata may include one or more of the same information and/or types of metadata (e.g., source information, file information, content information, contextual information, and/or other information) as the existing metadata. Supplemental metadata may add to, remove from, and/or replace the existing metadata. The supplemental metadata may be associated with the online content to which it pertains by the one or more processors (e.g., supplemental metadata component 110). The supplemental metadata may be associated with the online content responsive to content component 106, and/or other components obtaining the online content. The supplemental metadata may be associated with the online content based on the supplemental metadata including information indicating an association with the online content, information indicating the supplemental metadata is related and/or relevant to the online content, information indicating a source of the online content and/or supplemental metadata, and/or other information.

The content information may describe and/or be related to content included in the online content. The content included in the online content may include, for example, one or more of, music included in the online content, images depicted in the online content, objects included in the online content, text corresponding to dialogue of the online content, and/or other content or types of content included in the online content. The content information may include temporal information associated with the content included in the online content. The temporal information may indicate points in time within the online content associated with individual ones of the content included in the online content. As such, for example, the temporal indication associated with an image depicted in the online content may indicate a point in time within the duration of the online content the image is presented. The content information may be used to identify one or more events within online content.

The content information and/or temporal information may indicate the content that appears and/or is presented within the online content and when. For example, the content information may include the name of a song that is presented within the online content and the time interval at which it is presented. In some implementations, the content information may be used to indicate and/or identify items that need to be addressed and/or content that needs to be removed and/or replaced within the online content (e.g., trademarks, faces of people, curse words, etc.).

Contextual information may be indirectly associated with the online content. For example, information indirectly associated with the online content may include information from one or more sources besides the distribution platform from which the online content was obtained (e.g., other distribution platforms, social media platforms, and/or other sources), information relevant to the online content, and/or information otherwise indirectly associated with the online content. Contextual information may include one or more of a trending topic related to the online content (e.g., obtained from one or more social media platforms, distribution platforms, and/or other sources), user comments directed and/or related to the online content, rights (e.g., intellectual property rights, ownership rights, royalty rights, and/or other rights) associated with the online content, tags (e.g., hash tags, optimization tags for conventional search engines, internal keyword tags used in the internal search tool, and/or other tags) associated with the online content, editorial text associated with the online content, and/or other contextual information.

Supplemental metadata component 110 may be configured to generate the supplemental metadata from the online content. As such, obtaining the supplemental metadata may include generating the supplemental metadata from the online content. The online content may be processed, by supplemental metadata component 110, to obtain one or more of the platform information related to distribution of the online content through the online content distribution platform, the file information related to the electronic file that defines the online content, the content information related to the contents of the online content; the contextual information indirectly associated with the online content, and/or other information. The supplemental metadata component 110 may be configured to generate the supplemental metadata for the online content based on one or more of the platform information, the file information, the content information, the contextual information, and/or other obtained via processing the online content.

For example, processing the online content may include identifying one or more images and/or objects presented within the online content, performing voice to text conversion of dialogue with the online content, identifying music within the online content, identifying a size and/or other parameter of the online content, receiving supplemental content associated with the online content from one or more sources, de-endslating, and/or other processing. Processing the online content may include generating time indications associated with one of more events identified via the processing. For example, some ingested online content may include endslates (e.g., an advertisement, link, and/or other content at the end of an individual online content) that may not be transferrable and/or compatible with some distribution platforms. Processing the online content may include starting and/or stopping the online content at one or more time indications (e.g., indicated via the processing and/or by a user) to remove the endslate and/or create a similar online content that stops prior to the endslate beginning.

Obtaining the supplemental metadata may include receiving, by supplemental metadata component 110, one or more of source information, file information, content information, contextual information, and/or other information from one or more client computing platforms associated with the users. The supplemental metadata may be transmitted over the network by the one or more client computing platforms associated with the users such that it is received by supplemental metadata component 110. The source information, file information, content information, contextual information, and/or other information may be indicated, selected, and/or generated by one or more of the users. As such, the supplemental metadata may be user indicated, selected, and/or generated. The users indicating, selecting, and/or generating the supplemental metadata may include one or more of a content manager, editing entity, content verifier, rights clearing house, rights holder, talent, content editors, and/or other users.

Search component 112 may be configured to receive a search query from one or more client computing platforms associated with users. The search query may be transmitted over the network by the one or more client computing platforms associated the users such that it is received by search component 112. Users may input and/or select parameters of a search query via a graphical user interface. The search query may define parameters of metadata associated with online content the user generating the query is searching for. Search component 112 may be configured to generate a result for the search query based the existing metadata and/or the supplemental metadata. The search query may include filtering, sorting, a text search query, and/or other search queries. The result may include the online content associated with the existing metadata and/or the supplemental metadata satisfying the search query. For example, the result may include online content associated with the existing metadata and/or the supplemental metadata that satisfies the parameters of the search query. The result of the search query (e.g., the online content) may include one or more individual online content, and/or other online content.

Search component 112 may be configured to communicate and/or transmit information (e.g., to user interface component 118) to effectuate presentation of the result on the one or more client computing platforms associated with the users. Effectuating presentation of the result may include causing the one or more client computing platforms to display the result (e.g., within a graphical user interface). In some implementations, users may be able to bundle and/or group individual ones of the online content together. An individual online content may be included in one or more bundles with other individual online contents. The bundles and/or groups may be saved within system 100, distributed to one or more distribution platforms, used for facilitating the processing guidelines and/or workflows, and/or used for other purposes. For example a user may create a bundle and/or may share the bundle with other users. The system may keep track of the status (e.g., clearance and/or editorial) of each bundle. As such, for example, a single user may delegate tasks to other users through bundles and identify how each task is progressing.

Distribution platform component 114 may be configured to identify a distribution platform that an individual online content should be transmitted to. The distribution platform that the individual online content should be transmitted to may be identified based on one more of the existing metadata, the supplemental metadata, other metadata, and/or other information. A distribution platform may include an online content distribution platform, a television distribution platform (e.g., DISH®, etc.), a network distribution platform (e.g., MSN®, AOL®, etc.), streaming distribution platforms (e.g., ROKU®, XBOX®, etc.), a channel within a distribution platform, and/or other distribution platforms. In some implementations, the distribution platforms may be configured to present the individual online content (which may or may not be online and/or accessed via a network), online content, and/or other content.

In some implementations, the online content may be distributed by distribution platform 114 via a direct transfer, set up through a feed, and/or via other distribution methods.

As such, transmitting the online content may include transmitting one or more individual online content via a direct transfer to the distribution platform, providing a feed of one or more individual online content to the distribution platform, and/or other transmitting methods. In the feed method, the user (e.g., a content moderator, etc.) may mark a piece of online content to be included in and/or removed from a particular distribution platform's feed. The distribution platform may request the feed and/or receive the content and/or links to the online content and/or metadata. They distribution platforms may make a request at any time. For example, requests may be made milliseconds, days, and/or at any time in between the time the content is put in the feed. The requests for example may include ad hoc and/or periodic requests. In some implementations, the distribution platforms may be notified of any changes to the feed. The distribution platforms may receive the entire feed, updates since a specific time, and/or updates since the last time they saw the feed. The distribution platforms may filter the feed by specific criteria. For example, the distribution platforms may filter by a specific channel and get content only belonging to that channel.

Distribution platform component 114 may be configured to obtain distribution platform specific processing guidelines corresponding to the identified distribution platform. The distribution platform specific processing guidelines may indicate one or more guidelines the online content should meet and/or steps the online content should go through in order to be distributed via the corresponding distribution platform. Some of the individual ones of the distribution platform specific processing guidelines may be same, and/or some may be different from each other.

Distribution platform component 114 may be configured to determine whether the individual online content is ready to be distributed to the identified distribution platform. Whether the individual online content is ready to be distributed to the identified distribution platform may be determined according to the distribution platform specific processing guidelines and/or based on the existing metadata, the supplemental metadata, and/or other metadata and/or information associated with the individual online content. As such, the various distribution platforms may have different online content and/or metadata requirements, guidelines, and/or parameters the online content should meet prior to being distributed via the distribution platforms.

The distribution platform specific processing guidelines may indicate and/or include one or more checks online content should pass through before being distributed via the distribution platform. For example, the checks may include one or more of a clearance check, an editorial check, a quality control check, a rating check, and/or other checks. The clearance check may include a legal clearance check that verifies the online content does not include any legally protected content and/or that the appropriate permissions and/or citations are included. The supplemental metadata (e.g., the content information, etc.) and/or existing metadata may be relevant to and/or used as a basis for the clearance check. For example, during the clearance check, distribution platform component 114 may be configured to blur out and/or verify that a trademark identified within an online video (e.g., based on the content information) was previously blurred out.

The editorial check may include verifying that the online content meets the metadata requirements for a given distribution platform. The supplemental metadata and/or existing metadata may be relevant to and/or used as a basis for the editorial check. The quality control check may include verifying that the online content meets a minimum quality requirement for a given distribution platform. The supplemental metadata and/or existing metadata (e.g., the file information) may be relevant to and/or used as a basis for the quality control check. For example, during the quality control check, distribution platform component 114 may be configured to verify an online video was recorded a given bit rate to ensure it is viewable on a given user client computing platform. The rating check may determine whether the online content is suitable for the intended audience of a given distribution platform. For example, the rating check may use the supplemental metadata to determine that a piece of online content is not suitable for children and should not be distributed to a platform with children as the intended audience. In some implementations, the distribution platform specific processing guidelines may be user configurable (e.g., via a graphical user interface) by entities (e.g., distribution partners) that control the distribution platforms.

Transmission component 116 may be configured to transmit online content information conveying one or more of the individual online content, the existing metadata, the supplemental metadata, and/or other metadata associated with the individual online content to the identified distribution platform. The online content information may be transmitted to the identified distribution platform responsive to a determination that the individual online content is ready to be distributed to the identified distribution platform. The online content information may be transmitted over the network such that the online content is distributed via the distribution platforms for consumption (e.g., viewing) by one or more users. Transmitting the online content information may include generating a Media Really Simple Syndication and/or Media Rich Site Summary (MRSS) feed and/or transmitting the MRSS feed to one or more of the distribution platforms. In some implementations, metadata may be added as a tag and/or included in the MRSS feed.

In some implementations, user interface component 118 may be configured to effectuate presentation of a graphical user interface. The graphical user interface may be presented on one or more client computing platforms 104. For example, the graphical user interface may be used by a user to select the parameters of a search query, display the results of a search query, edit the online content, provide and/or receive information related to the online content, and/or otherwise present information associated with system 100 and/or components 106-116 to one or more users. User interface component 118 may be configured to obtain information from and/or communicate with one or more of content component 106, metadata processing component 108, supplemental metadata component 110, search component 112, distribution platform component 114, transmission component 116, and/or other components. User interface component 118 may be configured to transmit the information obtained and/or received from one or more of the system components (e.g., components 106, 108, 110, 112, 114, and/or 116) to one or more client computing platforms 104 for presentation. In some implementations, user interface component may produce a graphical view of one or more of the system components (e.g., components 106, 108, 110, 112, 114, and/or 116) and/or information from one or more of the system components (e.g., components 106-116). As such, a user may be able to interact with and/or view information associated with system 100 via information transmitted, received, and/or obtained by user interface component 118.

The server(s) 102, client computing platforms 104, and/or external resources 36 may be operatively linked via one or more electronic communication links. For example, such electronic communication links may be established, at least in part, via a network 130 such as the Internet and/or other networks. It will be appreciated that this is not intended to be limiting and that the scope of this disclosure includes implementations in which server(s) 102, client computing platforms 104, and/or external resources 124 may be operatively linked via some other communication media.

The external resources 120 may include sources of information, hosts and/or providers of virtual spaces outside of system 100, external entities participating with system 100, external entities for digital content and/or digital content platforms, and/or other resources. In some implementations, some or all of the functionality attributed herein to external resources 120 may be provided by resources included in system 100.

The server(s) 102 may include electronic storage 122, one or more processor(s) 124, and/or other components. The server(s) 102 may include communication lines or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 are configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 are shown in FIG. 1 as a single entity, this is for illustrative purposes only. In some implementations, processor(s) 124 may include one or more processing units. These processing units may be physically located within the same device, or processor(s) 124 may represent processing functionality of a plurality of devices operating in coordination. The processor 14 may be configured to execute components 106-114. Processor 14 may be configured to execute components 108, 110, 111, 112, 114, 116, and/or 118 by software; hardware; firmware; some combination of software, hardware, and/or firmware; and/or other mechanisms for configuring processing capabilities on processor 14. Processor 14 may include a combination of processors, APIs, third party services, networks, and/or machine-readable instructions.

It should be appreciated that although components 106-118 are illustrated in FIG. 1 as being located and/or co-located within a particular component of system 100, in implementations in which physical processor(s) 124 include multiple processing units, one or more of components 106-118 may be located remotely from the other components. The description of the functionality provided by the different components 106-118 described herein is for illustrative purposes, and is not intended to be limiting, as any of components 106-118 may provide more or less functionality than is described. For example, one or more of components 106-118 may be eliminated, and some or all of its functionality may be incorporated, shared, integrated into, and/or otherwise provided by other ones of components 106-118. Note that physical processor(s) 124 may be configured to execute one or more additional components that may perform some or all of the functionality attributed herein to one of components 106-118.

One or more of the components of system 100 may be configured to present and/or provide a user interface to provide an interface between system 100 and a user through which the user can provide information to and receive information from system 100. This enables data, results, and/or instructions (e.g., determinations, selections, and/or other indications) and any other communicable items, collectively referred to as "information," to be communicated between the user and system 100. Examples of interface devices suitable for inclusion in a user interface include one or more of those associated with a computing platform, a keypad, buttons, switches, a keyboard, knobs, levers, a display screen, a touch screen, a mouse, speakers, a microphone, an indicator light, an audible alarm, and/or a printer. Information may be provided to a user by the user interface in the form of a graphical user interface.

It is to be understood that other communication techniques, either hard-wired or wireless, are also contemplated herein as a user interface. For example, in one embodiment, the user interface may be integrated with a removable storage interface provided by electronic storage 122. In this example, information is loaded into system 100 from removable storage (e.g., a smart card, a flash drive, a removable disk, etc.) that enables the user(s) to customize system 100. Other exemplary input devices and techniques adapted for use with system 100 as the user interface include, but are not limited to, an RS-232 port, RF link, an IR link, modem (telephone, cable, Ethernet, internet or other). In short, any technique for communicating information with system 100 is contemplated as the user interface.

Figure 3:
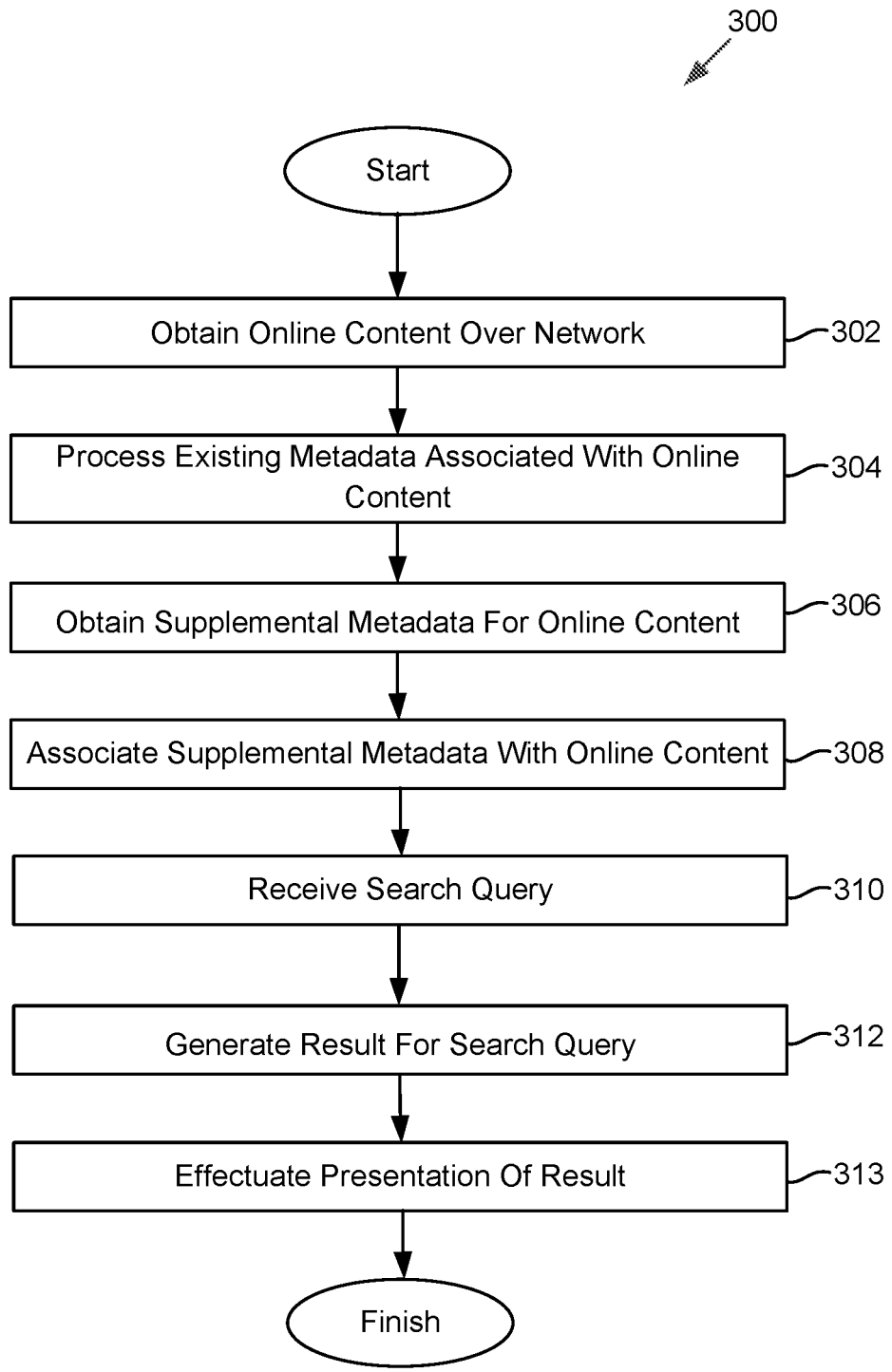
FIG. 3 illustrates a method for providing a searchable platform for online content including metadata, in accordance with one or more implementations.

FIG. 3 illustrates an exemplary method 300 for providing a searchable platform for online content including metadata, in accordance with one or more implementations. The operations of method 300 presented below are intended to be illustrative and non-limiting examples. In certain implementations, method 300 may be accomplished with one or more additional operations not described, and/or without one or more of the operations discussed. Additionally, the order in which the operations of method 300 are illustrated in FIG. 3 and described below is not intended to be limiting.

In certain implementations, method 300 may be implemented in one or more processing devices (e.g., a digital processor, an analog processor, a digital circuit designed to process information, an analog circuit designed to process information, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

Regarding method 300, at an operation 302, online content may be obtained over a network. The online content obtained may be available to content consumers through an online content distribution platform. The online content may have existing metadata associated with the online content. The existing metadata may include one or more of (i) platform information related to distribution of the online content through the online content distribution platform, (ii) file information related to an electronic file that defines the online content, and/or other information. In some implementations, operation 302 is performed by a content component the same as or similar to content component 106 (shown in FIG. 1 and described herein).

At an operation 304, the existing metadata associated with the online content may be processed. The existing metadata may be processed such that the existing metadata is searchable. In some implementations, operation 304 is performed by a metadata processing component the same as or similar to metadata processing component 108 (shown in FIG. 1 and described herein).

At an operation 306, supplemental metadata for the online content may be obtained. In some implementations, operation 306 is performed by a supplemental metadata component the same as or similar to supplemental metadata component 110 (shown in FIG. 1 and described herein).

At an operation 308, the supplemental metadata may be associated with the online content. The supplemental metadata may include one or more of platform information, file information, content information, contextual information, and/or other information. The content information may describe and/or be related to content included in the online content. The contextual information may be indirectly associated with the online content. In some implementations, operation 308 is performed by a supplemental metadata component the same as or similar to supplemental metadata component 110 (shown in FIG. 1 and described herein).

At an operation 310, a search query may be received over the network. The search query may be received from one or more client computing platforms associated with users. In some implementations, operation 310 is performed by a search component the same as or similar to search component 112 (shown in FIG. 1 and described herein).

At an operation 312, a result for the search query may be generated based the existing metadata and/or the supplemental metadata. The result may include the online content associated with the existing metadata and/or the supplemental metadata satisfying the search query. In some implementations, operation 312 is performed by a search component the same as or similar to search component 112 (shown in FIG. 1 and described herein).

At an operation 314, presentation of the result may be effectuated on the one or more client computing platforms associated with the users. In some implementations, operation 314 is performed by a search component the same as or similar to search component 112 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide a searchable platform for online content, the system comprising:
   one or more physical processors configured by machine-readable instructions to:
   pull online content comprising multiple videos over a network from multiple online content distribution platforms, wherein the online content distribution platforms host the online content over the network such that content consumers, separate and distinct from creators of the online content, view the online content by accessing the online content distribution platforms via consumer client computing platforms, the online content having existing metadata associated with the online content, wherein the existing metadata includes (i) platform information related to distribution of the online content through the multiple online content distribution platforms, and (ii) file information related to an electronic file that defines the online content;
   process the existing metadata associated with the online content such that the existing metadata is searchable;
   obtain supplemental metadata for the online content;
   associate the supplemental metadata with the online content, the supplemental metadata including one or more of the platform information, the file information, content information describing and/or related to content included in the online content, and/or contextual information indirectly associated with the online content;
   receive a search query over the network from one or more client computing platforms associated with users;
   generate a result for the search query based the existing metadata and/or the supplemental metadata, wherein the result includes the online content associated with the existing metadata and/or the supplemental metadata satisfying the search query;
   effectuate presentation of the result on the one or more client computing platforms associated with the users;
   identify a particular distribution platform that the online content should be transmitted to;
   obtain distribution platform-specific processing guidelines corresponding to the particular distribution platform, the distribution platform-specific processing guidelines indicating guidelines the online content should meet and/or steps the online content should go through in order to be distributed via the particular distribution platform;
   determine, according to the distribution platform-specific processing guidelines and based on the existing metadata and/or the supplemental metadata associated with the online content, whether the online content is ready to be distributed to the particular distribution platform; and
   responsive to a determination that the online content is not ready to be distributed to the particular distribution platform, transmit the online content to an editing platform so that the online content is edited and/or modified to meet the distribution platform-specific processing guidelines.

2. The system of claim 1, wherein obtaining the supplemental metadata includes generating the supplemental metadata from the online content such that the one or more physical processors are further configured by machine-readable instructions to:
  process the online content to obtain one or more of (i) the platform information related to distribution of the online content through the online content distribution platform, (ii) the file information related to the electronic file that defines the online content, (iii) the content information related to the contents of the online content; and/or (iv) the contextual information indirectly associated with the online content; and
  generate the supplemental metadata for the online content based on one or more of the platform information, the file information, the content information, and/or the contextual information obtained via processing the online content.

3. The system of claim 1, wherein obtaining the supplemental metadata includes:
  receiving, over the network from the one or more client computing platforms associated with the users, one or more of the platform information, the file information, the content information, and/or the contextual information that is indicated, selected, and/or generated by one or more of the users.

4. The system of claim 1, wherein the content included in the online content includes one or more of music included in the online content, images depicted in the online content, objects included in the online content, and/or text corresponding to dialogue of the online content, and wherein the content information includes temporal information indicating points in time within the online content associated with individual ones of the content included in the online content.

5. The system of claim 1, wherein the platform information includes one or more of a channel with which the online content is associated, title information of the online content, caption information of the online content, online content description information, search engine optimization keywords associated with the online content, publish date of the online content, view count of the online content, playlist associated with the online content, viewer retention information related to the online content, artwork associated with the online content, and/or rating information for the online content.

6. The system of claim 1, wherein the file information includes one or more of a file type, file size, resolution, encoding format, and/or bit rate related to the electronic file that defines the online content.

7. The system of claim 1, wherein the contextual information includes one or more of a trending topic related to the online content, user comments directed and/or related to the online content, rights associated with the online content, tags associated with the online content, and/or editorial text associated with the online content.

8. The system of claim 1, wherein the one or more physical processors are further configured by machine-readable instructions to:
  transmit over a network, responsive to a determination that the individual online content is ready to be distributed to the identified distribution platform, online content information conveying the individual online content and one or both of the existing metadata and the supplemental metadata associated with the individual online content to the particular distribution platform.

9. The system of claim 1, wherein the distribution platform specific processing guidelines includes checks the individual online content should pass through before being distributed via the particular distribution platform, the checks including one or more of a legal clearance check, an editorial check, a quality control check, and/or a rating check.

10. The system of claim 1, wherein the one or more physical processors are further configured by machine-readable instructions to:
  identify a second particular distribution platform that the online content should be transmitted to, the second particular distribution platform being different from the particular distribution platform;
  obtain second distribution platform-specific processing guidelines corresponding to the second particular distribution platform, the second particular distribution platform-specific processing guidelines indicating second guidelines the online content should meet and/or steps the online content should go through in order to be distributed via the second particular distribution platform;
  determine, according to the second distribution platform-specific processing guidelines and based on the existing metadata and/or the supplemental metadata associated with the online content, whether the online content is ready to be distributed to the second particular distribution platform; and
  responsive to a determination that the online content is not ready to be distributed to the second particular distribution platform, transmit the online content to the editing platform so that the online content is edited and/or modified to meet the second distribution platform-specific processing guidelines.

11. A method to provide a searchable platform for online content, the method being implemented by a computer system including one or more physical processors configured by machine-readable instructions, the method comprising:
  pulling online content comprising multiple videos over a network from multiple online content distribution platforms, wherein the online content distribution platforms host the online content over the network such that content consumers, separate and distinct from creators of the online content, view the online content by accessing the online content distribution platforms via consumer client computing platforms, the online content having existing metadata associated with the online content, wherein the existing metadata includes (i) platform information related to distribution of the online content through the multiple online content distribution platforms, and (ii) file information related to an electronic file that defines the online content;
  processing the existing metadata associated with the online content such that the existing metadata is searchable;
  obtaining supplemental metadata for the online content;
  associating the supplemental metadata with the online content, the supplemental metadata including one or more of the platform information, the file information, content information describing and/or related to content included in the online content, and/or contextual information indirectly associated with the online content;

receiving a search query over the network from one or more client computing platforms associated with users;

generating a result for the search query based the existing metadata and/or the supplemental metadata, wherein the result includes the online content associated with the existing metadata and/or the supplemental metadata satisfying the search query;

effectuating presentation of the result on the one or more client computing platforms associated with the users;

identifying a particular distribution platform that the online content should be transmitted to;

obtaining distribution platform-specific processing guidelines corresponding to the particular distribution platform, the distribution platform-specific processing guidelines indicating guidelines the online content should meet and/or steps the online content should go through in order to be distributed via the particular distribution platform;

determining, according to the distribution platform-specific processing guidelines and based on the existing metadata and/or the supplemental metadata associated with the online content, whether the online content is ready to be distributed to the particular distribution platform; and responsive to a determination that the online content is not ready to be distributed to the particular distribution platform, transmitting the online content to an editing platform so that the online content is edited and/or modified to meet the distribution platform-specific processing guidelines.

12. The method of claim 11, wherein obtaining the supplemental metadata includes generating the supplemental metadata from the online content such that the method further comprises:

processing the online content to obtain one or more of (i) the platform information related to distribution of the online content through the online content distribution platform, (ii) the file information related to the electronic file that defines the online content, (iii) the content information related to the contents of the online content; and/or (iv) the contextual information indirectly associated with the online content; and generating the supplemental metadata for the online content based on one or more of the platform information, the file information, the content information, and/or the contextual information obtained via processing the online content.

13. The method of claim 11, wherein obtaining the supplemental metadata includes:

receiving, over the network from the one or more client computing platforms associated with the users, one or more of the platform information, the file information, the content information, and/or the contextual information that is indicated, selected, and/or generated by one or more of the users.

14. The method of claim 11, wherein the content included in the online content includes one or more of music included in the online content, images depicted in the online content, objects included in the online content, and/or text corresponding to dialogue of the online content, and wherein the content information includes temporal information indicating points in time within the online content associated with individual ones of the content included in the online content.

15. The method of claim 11, wherein the platform information includes one or more of a channel with which the online content is associated, title information of the online content, caption information of the online content, online content description information, search engine optimization keywords associated with the online content, publish date of the online content, view count of the online content, playlist associated with the online content, viewer retention information related to the online content, artwork associated with the online content, and/or rating information for the online content.

16. The method of claim 11, wherein the file information includes one or more of a file type, file size, resolution, encoding format, and/or bit rate related to the electronic file that defines the online content.

17. The method of claim 11, wherein the contextual information includes one or more of a trending topic related to the online content, user comments directed and/or related to the online content, rights associated with the online content, tags associated with the online content, and/or editorial text associated with the online content.

18. The method of claim 11, further comprising:

transmitting over a network, responsive to a determination that the individual online content is ready to be distributed to the identified distribution platform, online content information conveying the individual online content and one or both of the existing metadata and the supplemental metadata associated with the individual online content to the particular distribution platform.

19. The method of claim 11, wherein the distribution platform specific processing guidelines includes checks the individual online content should pass through before being distributed via the particular distribution platform, the checks including one or more of a legal clearance check, an editorial check, a quality control check, and/or a rating check.

20. The method of claim 11, further comprising:

identifying a second particular distribution platform that the online content should be transmitted to, the second particular distribution platform being different from the particular distribution platform;

obtaining second distribution platform-specific processing guidelines corresponding to the second particular distribution platform, the second particular distribution platform-specific processing guidelines indicating second guidelines the online content should meet and/or steps the online content should go through in order to be distributed via the second particular distribution platform;

determining, according to the second distribution platform-specific processing guidelines and based on the existing metadata and/or the supplemental metadata associated with the online content, whether the online content is ready to be distributed to the second particular distribution platform; and responsive to a determination that the online content is not ready to be distributed to the second particular distribution platform, transmitting the online content to the editing platform so that the online content is edited and/or modified to meet the second distribution platform-specific processing guidelines.

* * * * *